3,029,151
METHOD FOR PRODUCING CONCENTRATED SMALL PARTICLE SIZE SILICA SOLS

Raymond Reuter, Orland Park, and Lewis E. Reven, La Grange Park, Ill., assignors to Nalco Chemical Company, a corporation of Delaware
No Drawing. Filed Dec. 8, 1958, Ser. No. 778,561
7 Claims. (Cl. 106—38.3)

This invention relates to a method for preparing aqueous colloidal silica sols which have relatively high silica concentrations, contain small particles of silica and have a high electrical conductivity. The invention also relates to the use of sols in the binding of ceramic materials.

In U.S. 2,856,302, it is shown that aqueous silica sols having the smallest particle size and the highest conductivity for a given silica concentration are most desirable for use in binding ceramic materials. Sols having these characteristics are extremely valuable as binding agents for precision investment casting molds. Their most useful property, when employed as ceramic binders, is their ability to produce rigid gels by the addition of certain electrolytes.

Small particle size, concentrated, aqueous silica sols are also described in U.S. 2,750,345. The products described in this patent are water-clear sols having silica particles within the range of 5–8 millimicrons in diameter. While these sols possess many unusual characteristics, they are not entirely satisfactory as ceramic binding materials. In order to produce sols of the type described in U.S. 2,750,345, it is necessary to follow a rather complex series of steps that, of necessity, adds to the cost of the finished product. Other methods for producing fine particle size silica sols are known to the art but the products are usually very dilute and cannot be concentrated without gelation occurring. Therefore, until the advent of the present invention, it has often been necessary to use a rather cumbersome manufacturing process to produce stable, concentrated, small particle size silica sols.

It is interesting to note that one characteristic, which seemed to be inherent in most aqueous silica sols, was the fact that upon aging the gel time tended to vary when such sols were treated with electrolytes under a specific set of conditions. Certain sols of this invention have the advantage of having a uniform gel time which does not vary under conditions of long term storage.

In accordance with the invention, it has been found that concentrated, aqueous colloidal silica sols which contain from between 12 and 28% by weight of silica, an average particle size within the range of 6–10 millimicrons and a conductivity of at least 700 micromhos may be produced in accordance with the following procedure:

(1) A dilute solution of an alkali metal silicate, e.g., sodium silicate, is converted to an acidic silica sol by contacting a cation exchange resin in the hydrogen form. This method of producing dilute acidic sols is described in Bird patent, U.S. 2,244,325. Due to their limited shelf life and tendency to form gel particles when in contact with the resin, it is preferred to produce acid sols having silica concentrations between 2%–6%. Preferably the starting acid sol has a silica concentration between 3%–4%. In no event should the acid sol have particles of silica in excess of 4 millimicrons in diameter. Other methods for producing acid sols may be used providing the sols meet the requirements set forth above. Such methods are described in the specification of U.S. 2,574,902.

(2) The starting acid sol is treated with an alkali metal base such as sodium or potassium hydroxides or silicates or the like, to adjust the pH of the acid sol to between 8.3 and 8.8. In a preferred embodiment, the pH is adjusted to between 8.4–8.6. As will be seen later, a most preferred pH is 8.5 to 8.7 and the alkali metal base material is a mixture of sodium and potassium bases which are combined to furnish a sodium to potassium molar ratio of from 1.3:1 to 1.5:1.

(3) The alkali treated sol of 2 is then heated to a temperature between 90° F.–200° F. under conditions whereby substantially no water is lost by evaporation. The temperature is preferably maintained between 140° F. and 180° F. As the heating begins, the pH of the alkali treated sol will begin to increase. At the time the increase is first noted, acid sol of the type described in 1 above is added to maintain the pH within the ranges specified. The pH adjustment wtih acid sol is continued until the pH of the sol being treated reaches an equilibrium value which is within the pH ranges specified in step 2 above.

In its preferred from this particular step requires that the pH of the sol by maintained at a constant value equivalent to the pH of the starting alkali-adjusted sol throughout a period of time until the sol establishes a pH comparable to the starting pH.

(4) The finished sol produced in 3 above is then evaporated until a silica concentration between 12 and 28% by weight has been reached. During this concentration step which is normally carried out by boiling, there will be a slight increase in the pH which does not exceed a half of a pH unit. The pH may then be adjusted with acidic materials such as mineral acids to readjust the pH of the sol to the pH prior to the concentration step. This step is optional, yet is desirable when the ultimate use of the sol is that of a binder for investment casting molds.

The concentration is preferably conducted by taking a portion of the sol produced in 3, heating it to a temperature of between 160° F. and its boiling point, maintaining the volume of the evaporated liquid constant by adding more sol of the type produced in step 3. This constant volume procedure is continued until a sol of the desired silica concentration has been produced.

In order to illustrate the process outlined above, the following are given by way of example.

EXAMPLE I

A solution of sodium silicate having an $Na_2O$ to $SiO_2$ ratio of 1:3.2 was diluted to a $SiO_2$ concentration of 3.8% by weight. This dilute silicate solution was then passed through an ion exchange column containing a cation exchange resin in the hydrogen form. The sol thus produced had a silica concentration of approximately 3.5%, a pH of 3.4, and a conductivity of 680 micromhos. The particle size of the silica present was within the range of 1 to 3 millimicrons. The cation exchange resin used was a commercial material sold under the trade name of Nalcite HCR, a sulfonated copolymer of styrene and divinyl benzene. A more complete description of this cation exchange resin is given in U.S. 2,366,007.

The above illustrates the preparation of a typical preferred starting acid sol.

EXAMPLE II

Three liters of a sol produced in accordance with Example I were adjusted to a pH of 8.7 using sodium silicate. This sol was then heated to 160° F.–170° F. in a large laboratory beaker equipped with a stirrer. Care was taken to insure water was not lost by evaporation. After the heating was begun, the pH began to increase. At this point, acid sol was added to maintain the pH at 8.5. After 3 liters of acid sol had been added, the pH began to exceed 8.5 so 2 liters of the mixture were removed. At this point, the heat was continued for 90 minutes, and 2 liters of fresh acid sol were added, the last 30 minutes of which the sol had a constant pH of 8.5 without the addition of more acid sol.

This product was then boiled for 1½ hours. The finished product had a pH of 8.8, an average particle size of 7.5 millimicrons, a silica concentration of 15%, and a conductivity of 3300 micromhos.

EXAMPLE III

The same steps as Example II was used with the exception that the starting acid sol was adjusted to 8.5 with sodium silicate. The sol was concentrated by boiling until a silica concentration of 21.5% was reached. This sol had an average particle size of 8.5 millimicrons, a pH of 8.7, and a conductivity of 3750 micromhos. This sol was stable after 14 months.

EXAMPLE IV

Same as Example II except that the starting acid sol was adjusted to a pH of 8.5 adding a mixture of potassium hydroxide and sodium silicate, which mixture had a sodium to potassium molar ratio of 1.5:1. The sol was concentrated using a constant boiling technique which was discontinued when a silica concentration of 15% had been reached. The finished sol had a pH of 8.8, an average particle size of 6.6 millimicrons and a conductivity of 3500 micromhos. The finished sol was adjusted to a pH of 8.5 with sulfuric acid.

EXAMPLE V

Using the method of Example IV, four plant scale batches were made to determine the commercial feasibility of the process. The properties of the finished sols are listed below in Table I.

Table I

| Sol No. | 1 | 2 | 3 | 4 |
|---|---|---|---|---|
| pH | 8.65 | 8.65 | 8.70 | 8.70 |
| Conductance, mmhos | 3,000 | 2,700 | 3,500 | 3,500 |
| Average Particle Size in Millimicrons | 7.9 | 8.0 | 8.2 | 8.5 |
| Percent SiO₂ | 15.1 | 15.0 | 15.0 | 15.3 |

As previously indicated, certain of the sols produced in accordance with the process of the invention are particularly useful in the production of precision investment casting molds. Such sols are characterized in accordance with the following table.

Table II

| | |
|---|---|
| Percent $SiO_2$ | 15–18 |
| Average particle size in millimicrons | 6–10 |
| Na:K mole ratio | 1.3:1–1.5:1 |
| pH | 8.5–8.7 |
| Conductivity (micromhos) | 2500–3500 |

Sols of this type have constant gelation rates for periods of at least three months.

In order to determine the gel properties of the sols produced by the invention, the following gel test was used:

GEL TEST

To a 10 ml. sample add 0.070 gram of magnesium sulfate. While keeping the sample at 90° F., the various points of viscosity were observed and recorded by time. This test is repeated at intervals and the time required to the first jelly point is plotted. When a sol is stable, the gel time does not change. The first jelly point is that point at which the solution first shows a jelly-lump-like consistency, when the test container is tilted once sharply.

When this gel test was employed to determine the gelation characteristics of the sols produced by the invention, it was discovered that the gel times of the sol remained constant over prolonged periods of storage. It was found that the most useful sols for producing investment casting were those sols that had a gelation time between 20 and 40 minutes. This particular gel point, as determined at 90° F. by the test method described above, was deemed to be most suitable for producing precision investment casting molds. It gave the operator sufficient time to work the mold materials with the aqueous colloidal silica binder, yet would produce a finished mold with set-up and having a useful green strength within a relatively short time. Gel times falling within the range of 20 to 40 minutes under the conditions of the gel test specified above, were obtained only when silica sols of the type described in Table II were used. When other alkali metal materials were used to produce sols, the gelation rates would be different but, in all events, each rate would be constant over relatively long periods of storage.

To illustrate the uniformity of gelation time, Table III is presented. This table shows the results achieved by using the gel test on the sol of Example IV.

Table III

| Days' storage | Minutes to gel |
|---|---|
| 0 | 22 |
| 10 | 24 |
| 20 | 26 |
| 40 | 28 |
| 60 | 28 |
| 80 | 28 |

For purposes of comparison, a sol produced in accordance with U.S. 2,856,302 having a silica concentration of 15% was tested. While the gels produced were relatively rigid, nevertheless, the gel time upon aging tended to increase. Results of this test are shown in Table IV below.

Table IV

| Time in days | Minutes to gel |
|---|---|
| 0 | 60 |
| 10 | 80 |
| 20 | 88 |
| 40 | 98 |
| 60 | 102 |
| 80 | 102 |

In the making of refractory casting molds, the mold materials are usually referred to as refractories or as mold materials and are generally composed of silica plus a grog which is a dead, burned, ground-up fire brick material. Some of the materials used are sand, bentonite, kaolin, mullite, sillimanite, and bauxite. In general, the preferred ceramic particles which are bound together with a silica sol in accordance with the invention may be classified as silicas, zirconias, magnesias, and aluminas. Usually, the mold materials are not composed of any one of the above ingredients, but are a mixture of several types of ingredients blended in varying proportions which are dependent upon the type of molding operation to be conducted. A typical refractory used for molding steel consists of a minor portion of silica flour and silica sand uniformly mixed with a major proportion of grog. In the practice of the present invention, the best results are obtained when molding materials having silicates or a form thereof present as their chief ingredient are used.

Usual foundry practice is to mix the refractory material with a liquid vehicle until a slurry of cement-like consistency has been formed and to pour this mixture into the mold which contains the pattern to be cast. The mold is then tamped or vibrated until the refractory molding material is packed down into a solid uniform mass. The molds, after the packing operation are allowed to stand for a period of time to allow them to set up or gel. If the vehicle and binder used sets either too rapidly or too slowly, the production schedules will be hampered, and if such setting periods are too erratic, many molds may be rendered useless.

The formation of gels is dependent upon numerous factors which must be taken into consideration if proper controllable gels are to be formed when high gel strength sols are to be used as binders for refractory melting materials. As a general rule, the gels will form most rapidly at elevated temperatures. In foundry practice, particularly in the precision investment casting industry, the molding is done at temperatures between 70 to 90° F. The gel rate and the strength of the gel is critically dependent upon the type of electrolyte used as a gel accelerator as well as the amount thereof. As a general rule, strong electrolytes should be used in smaller amounts than weak electrolytes. If excess accelerator is used, the gelation will occur too rapidly and, as a result, the gels formed are not usable. In the practice of this invention, it has been found that excellent results have been obtained by using such electrolytes as Epsom salts, which is known chemically as magnesium sulfate, citric acid, magnesium silico-fluoride, and disodiumdihydrogen pyrophosphate.

In actual foundry practice, the gel time can be readily ascertained by simple routine experiment. The usual procedure is to test several samples of a sol with various electrolytes and concentrations thereof at temperatures normally used in the foundry operation. By plotting the gel times against the concentration of a given electrolyte at specific temperatures, graphs are obtained which may be employed in commercial operation.

While the silica sol liquid vehicles and binders prepared in accordance with the invention can be used in all types of operations where it is desired to bond refractory type materials, the invention is especially useful in the making of molds for precision investment casting.

Precision investment casting, sometimes known simply as investment casting, is commonly known to the art as casting by the "lost wax method." This process utilizes a soft melting, disposable form which is placed in a flask and is surrounded by molding material. After the mold has obtained green or gel strength, the mold is heated, as in the case of pattern wax at about 350° F. The wax is removed by melting out from the mold. The wax or other expendable pattern material exhibits its greatest force against the mold at its softening point which is below the boiling point of water. If the mold is not of sufficient green strength, small fissures or cracks, some of which are microscopic in size, are formed in the mold cavity and the resulting cast object will be defective.

The application of the invention to the manufacture of refractory casting molds is illustrated by the following additional examples.

EXAMPLE VI 6900 cc. of silica Sol No. 3, Example V, having dissolved therein 27.6 grams of technical grade magnesium silico-fluoride, were mixed with 50 to 60 pounds of an investment refractory molding material consisting primarily of ground fire brick refractory molding material with minor amounts of silica flour and sand. The ingredients were uniformly mixed until a smooth, cementitious-like slurry were obtained. This was poured into a paper-topped, metal flask containing a wax pattern and vibrated on a mechanical vibrator until the mold was packed hard. The entire process thus far described had taken about 30 minutes and the temperature of the slurry was about 70° F. Thirty minutes later the mold had gelled and possessed substantial green strength. The mold was allowed to stand overnight and the following morning the base plate was removed from the flask. The paper top containing the denser refractory particles was shaved from the flask and the flask containing the mold was placed in a dewaxing oven and heated at 350° F. for about 2½ hours at which time substantially all of the wax had melted out. The mold was removed and placed in a decarburizing furnace which was fired to about 1800° F. for about 4 hours, at which time the mold was removed and steel poured.

Throughout the entire process there were no defects in the mold and once it had gelled, it could be handled without danger of cracking or breaking. The castings produced were suitable and no hair-line cracks or rough spots were apparent. The gel time of the silica sol was of sufficient duration to give the operator ample time to work the mold without fear of gelation yet the mold was set within a reasonable period of time.

EXAMPLE VII

The procedure of Example VI was followed except that 48 grams of magnesium sulfate ($MgSO_4.H_2O$) was used as a gel accelerator and the mold gelled in 60 minutes from the time of the mixing of the mold ingredients. Essentially the same results were obtained.

EXAMPLE VIII

The mold refractory material used was the same as in Example VII. 41 grams of a magnesium sulfate ($MgSO_4.H_2O$) were dissolved in 2700 cc. of a silica sol shown in Example V. The temperature of this sol solution was 84° F. 25 pounds of the refractory were added to the magnesium sulfate-treated sol and thoroughly blended until a cementitious-like slurry was obtained. The mold slurry was poured into a flask containing a polystyrene pattern with wax gating and was vibrated on a vibrating machine until the mold was packed solid. This much of the operation was completed in about 13 minutes. The mold gelled in 31 minutes and was capable of normal handling. About 12 hours later the mold was fired at 1800° F. for 4 hours and steel was poured at the end of the firing period. The casting produced was of excellent quality.

In addition to having use for application of the type described above, the aqueous silica sol vehicles and binders may be used as dip coats for certain type patterns used in investment casting. They may also be used either with or without gel promoting electrolytes.

The vehicles and binders used in this invention are capable of storage for periods up to about 6 months and still retain their gel characteristics. Minor amounts of alcohol and glycol antifreeze liquids may be incorporated with the silica sols. Greater protection provided by larger amounts of antifreeze may be obtained provided that the alkalinity of the sols is decreased. When such antifreezes are used, the storage length of these sols is greatly diminished.

In using the sols above described, particularly where the dip coat process is contemplated, it is sometimes desirable to incorporate in the sol minor amounts of wetting agents and sometimes minor amounts of certain higher alcohols, e.g., n-octyl alcohol, which are useful in preventing any foaming that might occur in the mixing operation.

The invention is hereby claimed as follows:

1. The process of making a concentrated aqueous colloidal silica sol having an average particle size within the range of 6 to 10 millimicrons and a conductivity of at least 700 micromhos which comprises adjusting the pH of an acidic sol to between 8.3 and 8.8 with an alkali metal base, said acidic sol having an average particle size no greater than 4 millimicrons and a silica concentration of from 2% to 6% by weight, heating the alkali treated sol to between 90° F. and 200° F., under conditions whereby substantially no water is lost by evaporation, and during the heating step maintaining the pH between 8.3 and 8.8 by addition of said acidic sol until the pH reaches an equilibrium between 8.3 and 8.8 and then concentrating the resultant sol to a silica concentration between 12% and 28% by weight.

2. The process of making a concentrated aqueous colloidal silica sol having an average particle size within the range of 6 to 10 millimicrons and a conductivity of at least 700 micromhos which comprises adjusting the pH of an acidic sol to between 8.4 and 8.6 with an alkali metal base, said acidic sol having an average particle size no greater than 4 millimicrons and a silica concentration of from 2% to 6% by weight, heating the alkali treated sol to between 140° F. and 180° F., under conditions whereby substantially no water is lost by evaporation, and during the heating step maintaining the pH between 8.4 and 8.6 by the addition of said acid sol until the pH reaches an equilibrium between 8.4 and 8.6, and corresponds to the pH of the alkali treated sol prior to heating, and then concentrating the resultant sol to a silica concentration between 15% and 18% by weight.

3. The process of claim 2 where the alkali metal base is a mixture of sodium and potassium bases from the group consisting of sodium and potassium hydroxides and silicates having a sodium to potassium molar ratio of from 1.3:1 to 1.5:1 and the process is conducted at a pH of between 8.5 and 8.7.

4. An aqueous colloidal silica sol having the following properties and characteristics.

| | |
|---|---|
| $SiO_2$, percent | 15–18 |
| Average particle size in millimicrons | 6–10 |
| Na:K mole ratio | 1.3:1–1.5:1 |
| pH | 8.5–8.7 |
| Conductivity (micromhos) | 2500–3500 | said sol having a constant gelation rate for a period of at least three months.

5. The process of binding particles of ceramic material which comprises mixing particles of a ceramic material with the aqueous silica sol of claim 4, adding to said mixture an amount of an electrolyte sufficient to produce uniform controlled gelation of said silica sol, setting up the resultant mixture and firing the resultant product.

6. A process of forming a refractory casting mold which comprises slurrying silica refractory materials with the aqueous silica sol of claim 4, adding to said slurry an amount of electrolyte sufficient to produce uniform controlled gelation of the silica sol, setting up the mold, and firing said mold.

7. A process for forming an investment refractory casting mold which comprises slurrying investment refractory materials with the aqueous silica sol of claim 4, adding to said slurry an amount of electrolyte sufficient to produce uniform controlled gelation of the silica sol, setting up the mold, and firing the mold until it is suitable for use.

References Cited in the file of this patent

UNITED STATES PATENTS

| | | |
|---|---|---|
| 2,680,721 | Broge et al. | June 8, 1954 |
| 2,750,345 | Alexander | June 12, 1956 |
| 2,833,724 | Alexander et al. | May 6, 1958 |
| 2,856,302 | Reuter | Oct. 14, 1958 |